(12) United States Patent
Kikuchi (10) Patent No.: US 9,985,547 B2
(45) Date of Patent: *May 29, 2018

(54) INSULATION-TYPE SYNCHRONOUS DC/DC CONVERTER

(71) Applicant: ROHM CO., LTD., Ukyo-ku, Kyoto (JP)

(72) Inventor: Hiroki Kikuchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 55 days.

This patent is subject to a terminal disclaimer.

(21) Appl. No.: 15/224,928

(22) Filed: Aug. 1, 2016

(65) Prior Publication Data

US 2016/0344299 A1 Nov. 24, 2016

Related U.S. Application Data

(63) Continuation of application No. 14/814,954, filed on Jul. 31, 2015, now Pat. No. 9,438,128.

(30) Foreign Application Priority Data

Aug. 1, 2014 (JP) .................. 2014-158074

(51) Int. Cl.
*H02M 3/335* (2006.01)
*H02M 1/00* (2006.01)

(52) U.S. Cl.
CPC ... *H02M 3/33592* (2013.01); *H02M 3/33523* (2013.01); *H02M 2001/0032* (2013.01);
(Continued)

(58) Field of Classification Search
CPC ........ H02M 1/32; H02M 1/36; H02M 1/4225; H02M 2001/0035; H02M 2001/0058
See application file for complete search history.

(56) References Cited

U.S. PATENT DOCUMENTS

| 5,747,982 A | 5/1998 | Dromgoole et al. |
| 6,088,244 A | 7/2000 | Shioya et al. |

(Continued)

FOREIGN PATENT DOCUMENTS

| CN | 101471609 A | 7/2009 |
| CN | 101599701 A1 | 12/2009 |

(Continued)

OTHER PUBLICATIONS

SIPO First Office Action with Search Report for corresponding CN Application No. 201510462893.6; dated Aug. 11, 2017
(Continued)

*Primary Examiner* — Yusef Ahmed
(74) *Attorney, Agent, or Firm* — Cantor Colburn LLP (57) ABSTRACT

A synchronous rectifier controller is provided on a secondary side of an insulation-type synchronous DC/DC converter and controls the synchronous rectifier transistor. A driver circuit controls the synchronous rectifier transistor. A photo coupler connection terminal is coupled to an input side of the photo coupler. An error amplifier amplifies an error between a voltage detection signal according to an output voltage of the DC/DC converter and its target voltage, and to draw a current according to the error from an input side of the photo coupler via the photo coupler connection terminal.

12 Claims, 8 Drawing Sheets

(52) U.S. Cl.
CPC .. *H02M 2001/0054* (2013.01); *Y02B 70/1475* (2013.01); *Y02B 70/1491* (2013.01); *Y02B 70/16* (2013.01)

(56) References Cited

U.S. PATENT DOCUMENTS

| | | |
|---|---|---|
| 6,456,511 B1 | 9/2002 | Wong |
| 6,980,443 B2 | 12/2005 | Nagano |
| 8,520,415 B1 | 8/2013 | Krishnamoorthy et al. |
| 9,041,378 B1 | 5/2015 | Lam et al. |
| 2003/0039129 A1* | 2/2003 | Miyazaki .......... H02M 3/33576 363/26 |
| 2007/0040516 A1* | 2/2007 | Chen .................... H05B 39/045 315/291 |
| 2007/0097714 A1* | 5/2007 | Cebry ..................... H02M 1/38 363/21.06 |
| 2007/0103946 A1* | 5/2007 | Kyono .............. H02M 3/33592 363/21.14 |
| 2007/0139837 A1 | 6/2007 | Usui et al. |
| 2008/0073974 A1* | 3/2008 | Madigan ........... H02M 3/33561 307/31 |
| 2008/0123378 A1* | 5/2008 | Chiang .................. H02M 1/32 363/80 |
| 2008/0247194 A1* | 10/2008 | Ying .................. H02M 3/3376 363/17 |
| 2009/0109711 A1* | 4/2009 | Hsu ................... H02M 3/33592 363/21.14 |
| 2009/0109712 A1 | 4/2009 | Calloway |
| 2009/0284989 A1* | 11/2009 | Sato .................. H02M 3/33592 363/19 |
| 2011/0018590 A1* | 1/2011 | Tai .................... H02M 3/33523 327/103 |
| 2011/0085354 A1* | 4/2011 | Wang .................. H02M 1/4225 363/21.02 |
| 2011/0102411 A1* | 5/2011 | Chang .................. G09G 3/3406 345/212 |
| 2011/0157926 A1* | 6/2011 | Adragna ............. H02M 3/3376 363/23 |
| 2013/0107585 A1* | 5/2013 | Sims ................. H02M 3/33592 363/21.14 |
| 2013/0301310 A1* | 11/2013 | Wang .................... H02M 7/217 363/21.12 |
| 2013/0301311 A1* | 11/2013 | Wang ................ H02M 3/33515 363/21.13 |
| 2014/0016362 A1* | 1/2014 | Adragna ............. H02M 3/3376 363/21.02 |
| 2014/0071715 A1* | 3/2014 | Sato .................. H02M 3/33507 363/21.01 |
| 2014/0078789 A1* | 3/2014 | Li ...................... H02M 3/33507 363/21.15 |
| 2014/0160808 A1* | 6/2014 | Sato .................. H02M 3/33507 363/21.02 |
| 2014/0204625 A1* | 7/2014 | Liu ................... H02M 3/33592 363/21.13 |
| 2014/0254206 A1* | 9/2014 | Ou .................... H02M 3/33592 363/21.01 |
| 2014/0293658 A1* | 10/2014 | Cao .................. H02M 3/33576 363/21.02 |
| 2015/0103567 A1* | 4/2015 | Wang ................ H02M 3/33592 363/21.13 |
| 2016/0036340 A1* | 2/2016 | Kikuchi ................. H02M 1/32 363/21.14 |
| 2016/0181935 A1* | 6/2016 | Kikuchi ............ H02M 3/33592 363/21.14 |
| 2016/0261202 A1 | 9/2016 | Kikuchi et al. |

FOREIGN PATENT DOCUMENTS

| | | |
|---|---|---|
| CN | 101620012 A | 1/2010 |
| JP | H08185232 A | 7/1996 |
| JP | H09163736 A | 6/1997 |
| JP | 2009005461 A | 1/2009 |
| JP | 2010074959 A | 4/2010 |
| JP | 2014138457 A | 7/2014 |

OTHER PUBLICATIONS

USPTO Final Office Action corresponding to U.S. Appl. No. 14/814,966; dated Aug. 11, 2017.
U.S. Non-Final Office Action corresponding to U.S. Appl. No. 15/057,522; dated Oct. 20, 2017.
USPTO Non-Final Office Action for U.S. Appl. No. 14/814,966 dated Jan. 31, 2017.
USPTO Final Office Action corresponding to U.S. Appl. No. 15/057,522; dated Jun. 23, 2017.
SIPO Second Office Action for corresponding CN Application No. 201510462893.6; dated of Mar. 14, 2018.
JP Notification of Reasons for Refusal corresponding to Application No. 2014-158074; Mailing date of Mar. 26, 2018.

* cited by examiner

FIG.3A $V_{OUT}$

M1

FIG.3B $V_{OUT}$

INSULATION-TYPE SYNCHRONOUS DC/DC CONVERTER

CROSS-REFERENCE TO RELATED APPLICATIONS

The present application is a continuation application of U.S. patent application Ser. No. 14/814,954, filed on Jul. 31, 2015, the entire contents of which are incorporated herein by reference. The Ser. No. 14/814,954 application claimed the benefit of the date of the earlier filed Japanese Patent Application No. 2014-158074, filed Aug. 1, 2014, priority to which is also claimed herein, and the contents of which are also incorporated by reference herein.

BACKGROUND OF THE INVENTION

Field of the Invention

The present invention relates to a DC/DC converter.

Description of the Related Art

Various kinds of home appliances such as TVs, refrigerators etc., each receive externally applied commercial AC electric power for its operation. Also, electronic devices such as laptop computers, cellular phone terminals, and tablet devices are each configured to operate using commercial AC electric power, and/or to be capable of charging a built-in battery using the commercial AC electric power. Such home appliances and electronic devices (which will collectively be referred to as "electronic devices" hereafter) each include a built-in power supply apparatus (converter) configured to convert the commercial AC voltage to DC voltage. Alternatively, such a converter is built into an external power supply adapter (AC adapter) for such an electronic device.

Figure 1:
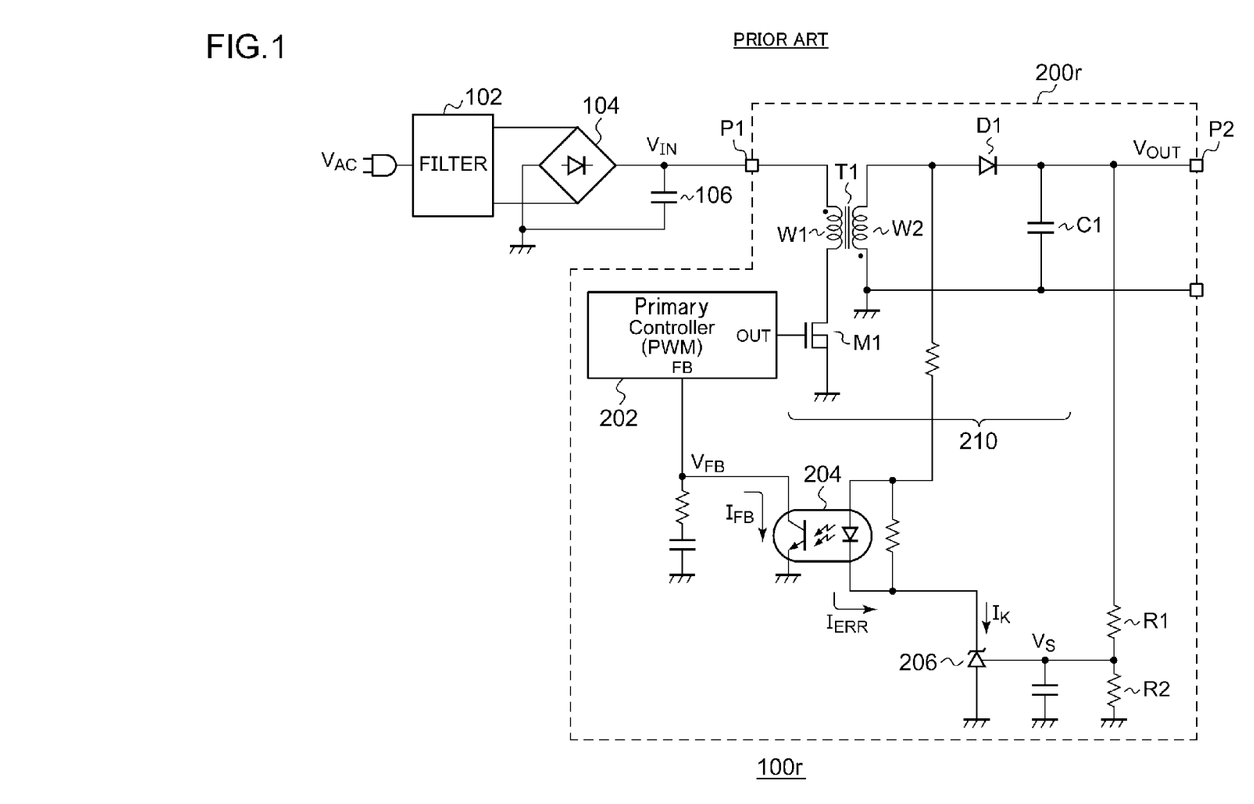
FIG. 1 is a block diagram showing an AC/DC converter investigated by the present inventor.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via an unshown fuse and an unshown input capacitor. The filter 102 removes noise included in the commercial AC voltage $V_{AC}$. The rectifier circuit 104 is configured as a diode bridge circuit which full-wave rectifies the commercial AC voltage $V_{AC}$. The output voltage of the rectifier circuit 104 is smoothed by the smoothing capacitor 106, thereby generating stabilized DC voltage $V_{IN}$.

The insulation-type DC/DC converter 200r receives the DC voltage $V_{IN}$ at its input terminal P1, steps down the DC voltage $V_{IN}$ and supplies an output voltage $V_{OUT}$ stabilized to the target value to a load (not shown) connected to its output terminal P2.

The DC/DC converter 200r includes a primary controller 202, a photo coupler 204, a shunt regulator 206, an output circuit 210, and additional circuit components. The output circuit 210 includes a transformer T1, a diode D1, an output capacitor C1, and a switching transistor M1. The output circuit 210 has a conventional topology, and accordingly, detailed description thereof will be omitted.

With the switching operation of the switching transistor M1, the input voltage $V_{IN}$ is stepped down, and the output voltage $V_{OUT}$ is generated. The controller 202 adjusts the duty ratio of the switching operation of the switching transistor M1 so as to stabilize the output voltage $V_{OUT}$ to the target value.

The output voltage $V_{OUT}$ of the DC/DC converter 200r is divided by the resistors R1 and R2. The shunt regulator 206 amplifies an error between the divided voltage (voltage detection signal) $V_S$ and a predetermined reference voltage $V_{REF}$, and draws (sinks) an error current $I_{ERR}$ according to the error from the light emitting device (LED) of the photo coupler 204.

Accordingly, a feedback current $I_{FB}$ flows through the light receiving device (photo transistor) of the photo coupler 204, which corresponds to the error current $I_{ERR}$ at the secondary side. The feedback current $I_{FB}$ is smoothed by a resistor and a capacitor, and is supplied to a feedback (FB) terminal of the controller 202. The controller 202 adjusts the duty cycle of the switching transistor M1 according to a feedback voltage $V_{FB}$ at the FB terminal.

The present inventors have investigated the AC/DC converter 100r, and have come to recognize the following problem. For a stable operation of the shunt regulator 206, a cathode current $I_K$ should be kept to some degree. The cathode current $I_K$ includes a component which contributes to the feedback operation and a constant bias component (i.e. idle current). For example, most of the shunt regulators on the market require the idle current of a several hundred microamperes (for instance, 700 microamperes), and this lowers an efficiency of the AC/DC converter 100r.

SUMMARY OF THE INVENTION

The present invention has been made in order to solve such a problem. Accordingly, it is an exemplary purpose of the present invention to provide a DC/DC converter with an improved efficiency.

An embodiment of the present invention relates to a synchronous rectifier controller provided on a secondary side of an insulation-type synchronous DC/DC converter. The synchronous rectifier controller controls the synchronous rectifier transistor. The isolation-type DC/DC converter comprises: a transformer having its primary winding and its secondary winding; a switching transistor coupled to the primary winding of the transformer; a synchronous rectifier transistor coupled to the secondary winding of the transformer; a photo coupler; and a primary controller coupled to an output of the photo coupler, and configured to control the switching transistor according to a feedback signal from the photo coupler. The synchronous rectifier controller comprises: a driver circuit for switching the synchronous rectifier transistor; a photo coupler connection terminal coupled to an input side of the photo coupler; and an error amplifier structured to amplify an error between a voltage detection signal according to an output voltage of the DC/DC converter and its target voltage, and to draw a current according to the error from an input side of the photo coupler via the photo coupler connection terminal. The synchronous rectifier controller is packaged in a single module.

With such an embodiment, an input current flowing through the photo coupler is generated by the error amplifier integrated in the synchronous rectifier controller, instead of the conventional shunt regulator. Accordingly, current consumption of the error amplifier can be reduced in comparison with that of the shunt regulator.

In one embodiment, a power supply plane for the error amplifier and a power supply plane for the driver circuit may be isolated each other, and a ground plane for the error amplifier and a ground plane for the driver circuit may be isolated each other.

Such an embodiment may support the circuit topology where the synchronous rectifier transistor is disposed at a higher voltage side of the secondary winding (output terminal side).

In one embodiment, the power supply plane for the error amplifier may be supplied with an internal power supply voltage which is generated from a voltage at the photo coupler connection terminal, and the ground plane of the error amplifier may be supplied with a ground voltage at the secondary side of the DC/DC converter.

In one embodiment, the synchronous rectifier transistor may be provided at a high voltage side of the secondary winding. The transformer may further comprise an auxiliary winding provided at its secondary side, and the DC/DC converter may be structured to generate, by using the auxiliary winding, a power supply voltage with reference to a voltage potential at a line connecting the synchronous rectifier transistor to the secondary winding. The ground plane of the driver circuit may be supplied with the voltage potential at the line, and the power supply plane of the driver circuit may be supplied with the power supply voltage.

In one embodiment, the error amplifier may be integrated on one semiconductor chip, and the driver circuit may be integrated on another semiconductor chip. This improves an isolation between the error amplifier and the driver circuit.

In one embodiment, the synchronous rectifier controller may further comprises the synchronous rectifier transistor, and may be packaged in the single module.

In one embodiment, the error amplifier may comprise: a differential amplifier that amplifies an error between the voltage detection signal and its target voltage; and an output transistor having its base/gate receiving an output signal of the differential amplifier, its emitter/source connected to the ground, and its collector/drain connected to the photo coupler connection terminal.

In one embodiment, the driver circuit may comprise: a pulse generator that generates a pulse signal, wherein a level of the pulse signal changes according to at least a voltage across the synchronous rectifier transistor; and a driver that drives the synchronous rectifier transistor according to the pulse signal.

In one embodiment, (i) the pulse generator may set the pulse signal at an on-level when the voltage across the synchronous rectifier transistor becomes lower than a predetermined negative first threshold voltage, and (ii) the pulse generator may set the pulse signal at an off-level when the voltage across the synchronous rectifier transistor becomes higher than a predetermined negative second threshold voltage, the second threshold voltage being higher than the first threshold voltage.

In one embodiment, the pulse generator may comprise: a set comparator structured to compare the voltage across the synchronous rectifier transistor and the first threshold voltage so as to generate a set pulse; a reset comparator structured to compare the voltage across the synchronous rectifier transistor and the second threshold voltage so as to generate a reset pulse; and a flip-flop structured to change its output according to the set pulse and the reset pulse.

In one embodiment, the pulse generator may further comprise a blanking circuit structured to mask the set pulse and the reset pulse for a predetermined period.

In one embodiment, the DC/DC converter may be a flyback converter. In one embodiment, the DC/DC converter may be a forward converter.

Another embodiment of the present invention relates to an insulation-type synchronous DC/DC converter. The synchronous DC/DC converter comprising: a transformer having its primary winding and its secondary winding; a switching transistor coupled to the primary winding of the transformer; a synchronous rectifier transistor coupled to the secondary winding of the transformer; an output capacitor; a photo coupler; the aforementioned synchronous rectifier controller structured to control the synchronous rectifier transistor, and to supply a current according to an error between an output voltage at the output capacitor and its target voltage to an input side of the photo coupler; and a primary controller coupled to an output of the photo coupler, and configured to control the switching transistor according to a feedback signal from the photo coupler.

Yet another embodiment of the present invention relates to a power supply apparatus (AC/DC converter). The power supply apparatus comprises: a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage, and to supply the DC input voltage thus stepped down to a load.

Yet another embodiment of the present invention relates to an electronic device. The electronic device comprises: a load; a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage, and to supply the DC input voltage thus stepped down to the load.

Yet another embodiment of the present invention relates to a power supply adapter. The power supply adapter comprises: a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage so as to generate the DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Figure 2:
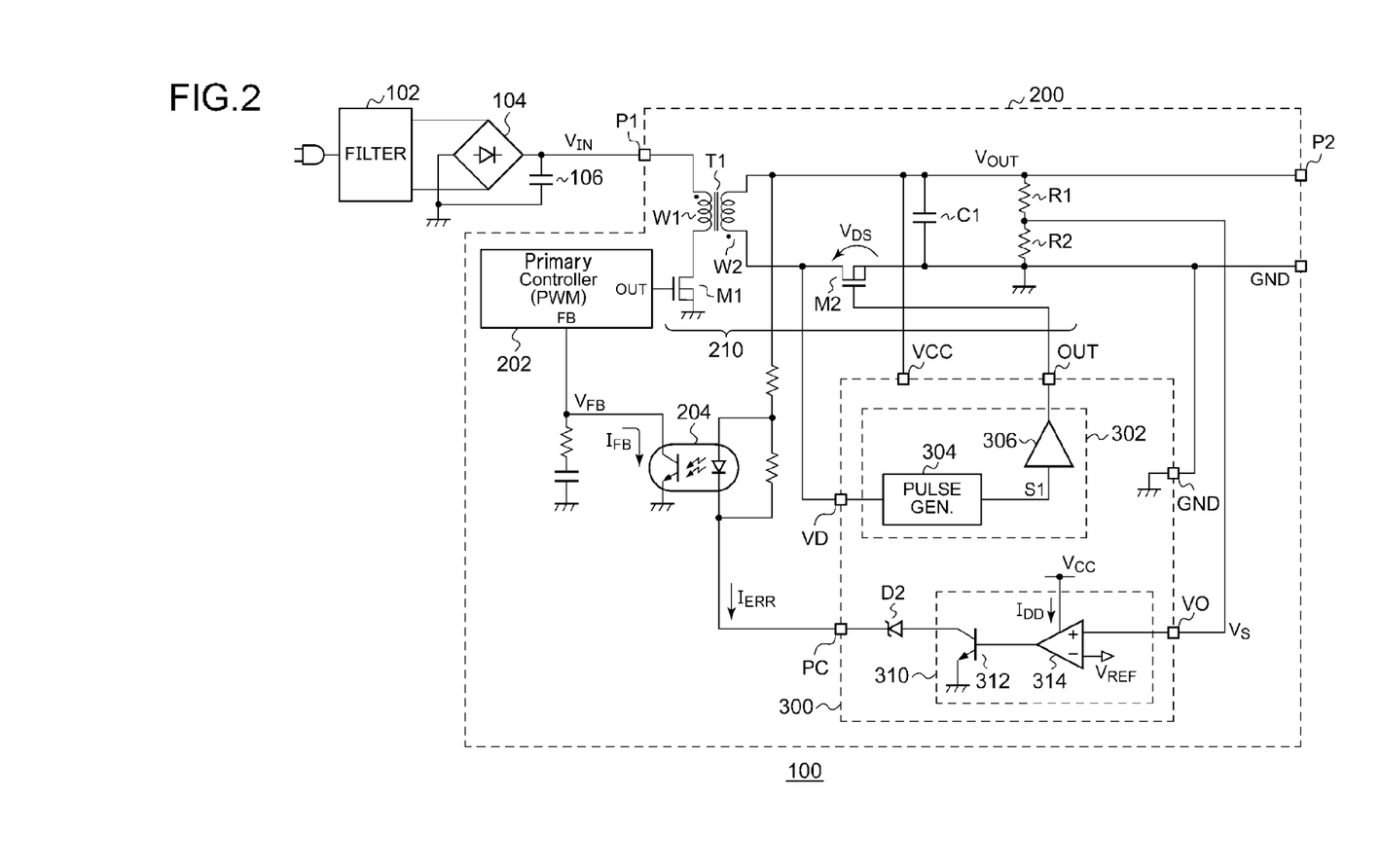
FIG. 2 is a circuit diagram of an AC/DC converter according to a first embodiment.

FIG. 2 is a circuit diagram of an AC/DC converter 100 according to a first embodiment. The AC/DC converter 100 includes a filter 102, a rectifier circuit 104, a smoothing capacitor 106, and an insulation-type DC/DC converter 200.

The DC/DC converter 200 includes a primary controller 202, a photo coupler 204, an output circuit 210, and a synchronous rectifier controller 300. The output circuit 210 has a topology of a synchronous flyback converter, and includes a transformer T1, a switching transistor M1 coupled to a primary winding W1, a synchronous rectifier transistor M2 coupled to a secondary winding W2, and an output capacitor C1. In this embodiment, the synchronous rectifier transistor M2 is provided at a lower voltage side of the secondary winding of the transformer T1 (ground potential side).

The synchronous rectifier controller 300 is provided at the secondary side of the DC/DC converter 200, and controls the synchronous rectifier transistor M2. A photo-coupler connection terminal (PC) is coupled to the cathode of the light emitting device (LED) at the input-side of the photo coupler 204. The VD terminal is coupled to receive a drain voltage $V_D$ of the synchronous rectifier transistor M2. The OUT terminal is coupled to the gate of the synchronous rectifier transistor M2. In one embodiment, synchronous rectifier transistor M2 may be built-in inside the synchronous rectifier controller 300. The VO terminal is coupled to receive a voltage detection signal $V_S$ according to the output voltage $V_{OUT}$. The GND terminal is coupled to a ground line of the secondary side of the transformer T1.

The synchronous rectifier controller 300 includes a driver circuit 302 and an error amplifier 310, and is packaged in a single module. The driver circuit 302 drives the synchronous rectifier transistor M2. Specifically, driver circuit 302 includes a pulse generator 304 structured to generate a pulse signal S1, and a driver 306 coupled to drive the synchronous rectifier transistor M2 according to the pulse signal S1.

The configuration of the pulse generator 304, and the method/scheme for generating the pulse signal S1 are not limited. In one embodiment, the pulse generator 304 may generate the pulse signal S1 at least based on a voltage across the synchronous rectifier transistor M2, i.e. a drain-source voltage $V_{DS}$. Specifically, the pulse generator 304 generates the pulse signal S1 according to the drain-source voltage $V_{DS}$ and two negative threshold voltages $V_{TH1}$ and $V_{TH2}$. These two threshold are determined to satisfy a relation of $V_{TH1} < V_{TH2} < 0$. For example, $V_{TH1} = -50$ mV, and $V_{TH2} = -10$ mV. The pulse generator 304 sets the pulse signal S1 at one level for turning-on the synchronous rectifier transistor M2 (ON-level, high level for example) when the drain-source voltage $V_{DS}$ becomes lower than the negative first threshold voltage $V_{TH1}$. Then, the pulse generator 304 sets the pulse signal at another level for turning-off the synchronous rectifier transistor M2 (OFF-level, low level for example) when the drain-source voltage $V_{DS}$ becomes higher than the negative second threshold voltage $V_{TH2}$.

The error amplifier 310 is coupled to amplify an error between the voltage detection signal $V_S$ according to the output voltage $V_{OUT}$ of the DC/DC converter 200 and its target voltage $V_{REF}$. The error amplifier 310 draws (sinks) an error current $I_{ERR}$ according to the error from an input side of the photo coupler 204 via the PC terminal. The error amplifier 310 has its output stage having open-collector/drain configuration, and a collector/drain of the transistor 312 of the output stage is coupled to the PC terminal. The differential amplifier 314 controls the base current or gate voltage of the transistor 312 based on the error between the voltage detection signal $V_S$ and the reference voltage $V_{REF}$. In the present embodiment, the diode D2 is inserted between the collector of the transistor 312 and the PC terminal for the purpose of a circuit protection and/or voltage level shift. In one embodiment, the diode D2 may be omitted.

The above is the configuration of the DC/DC converter 200 including the synchronous rectifier controller 300. Next, description will be made regarding the operation of the DC/DC converter 200.

The voltage detection signal $V_S$ becomes higher than the reference voltage $V_{REF}$, then the error current $I_{ERR}$ drawn by the transistor 312 increases and the feedback current $I_{FB}$ flowing through the photo transistor of the photo coupler 204. The feedback voltage $V_{FB}$ falls, and the duty cycle ratio (on-period) of the switching transistor M1 decreases and the voltage detection signal $V_S$ changes in one direction (fall down) so as to match the reference voltage $V_{REF}$ with feedback. Conversely, the voltage detection signal $V_S$ becomes lower than the reference voltage $V_{REF}$, then the error current $I_{ERR}$ drawn by the transistor 312 decreases and the feedback current $I_{FB}$ flowing through the light receiving device. When the feedback voltage $V_{FB}$ rises, the duty cycle ratio (on-period) of the switching transistor M1 increases and the voltage detection signal $V_S$ changes in the other direction (rise up) so as to match the reference voltage $V_{REF}$ by feedback control. Accordingly, the output voltage $V_{OUT}$ of the DC/DC converter 200 is maintain at its target level.

The DC/DC converter 200 provides the following advantage. In the synchronous rectifier controller 300, the error amplifier 310 is integrated on the same semiconductor chip on which the driver circuit 302 is integrated, and this reduces the current consumption of the error amplifier 310 in comparison with that of the shunt regulator 206 in FIG. 1 significantly.

The conventional DC/DC converter 200r of FIG. 1 can be implemented with the shunt regulator 206. Assuming that the current consumption of the shunt regulator 206 is about 700 uA and includes 150 uA of the current flowing through the light emitting device of the photo coupler 204, and the rest 550 uA flows through the shunt regulator 206 as its operation current $I_{DD}$. It is to be noted that the operation current $I_{DD}$ flows through a parallel circuit of the light emitting device and the resistor and it leads a power loss.

To the contrary, in the circuit of FIG. 2, the operation current $I_{DD}$ of the error amplifier 310 can be reduced to about 50 uA even when its output current $I_{ERR}$ is 150 uA, which is the same amount of the shunt regulator 206, and therefore, the efficiency of the DC/DC converter 200, especially in the light load state can be improved.

In one embodiment, the power supply terminal VCC of the synchronous rectifier controller 300 is coupled to the output line of the DC/DC converter 200, and the synchronous rectifier controller 300 operates with the output voltage $V_{OUT}$ as its power supply voltage (for example, 24 V). Then the power consumption of the error amplifier 310 is 24 V×200 uA=4.8 mW. Conversely, assuming the same condition, the power consumption of the shunt regulator 206 in FIG. 1 is 24 V×700 uA=16.8 mW, and DC/DC converter 200 of FIG. 2 can reduce its power consumption by 10 mW in comparison with the DC/DC converter 200r of FIG. 1.

Figures 3A, 3B:
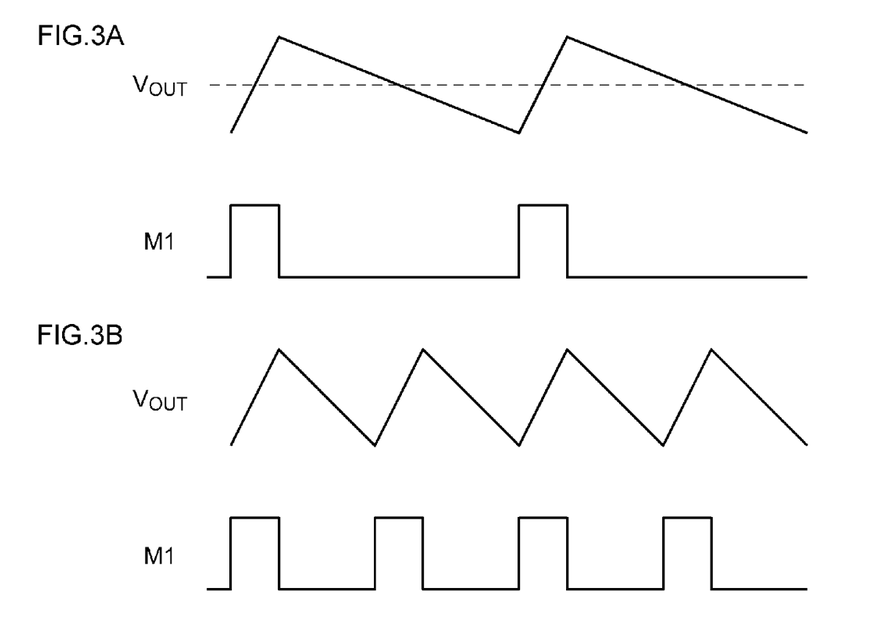
FIG. 3A is a waveform diagram showing the operation of the DC/DC converter in FIG. 2 in the PFM mode.
FIG. 3B is a waveform diagram showing the operation of the DC/DC converter in FIG. 1 in the PFM mode.

Further, the synchronous rectifier controller 300 provides the following advantage. In one embodiment, the DC/DC converter 200 may be operate intermittently (referred to as PFM mode) in the light load state. FIG. 3A is a waveform diagram showing the operation of the DC/DC converter 200 in FIG. 2 in the PFM mode. FIG. 3B shows the operation of the DC/DC converter 200r in FIG. 1 in the PFM mode.

In the PFM mode, the switching transistor M1 turns off after it keeps on-state for a certain on-period $T_{ON}$. The output voltage $V_{OUT}$ becomes lower than a threshold in the vicinity of its reference level, then the switching transistor M1 turns on again.

The off-period $T_{OFF}$ of the switching transistor M1 is expressed by the equation below using the capacitance C of the output capacitor C1, a ripple $\Delta V$ of the output voltage $V_{OUT}$, and a discharge current I from the output capacitor C1.

$$T_{OFF} = C \times \Delta V / I$$

And the switching period t is given as the expression below.

$$t = (T_{ON} + T_{OFF}) = T_{ON} + C \times \Delta V / I$$

Here, I represents the discharge current from the output capacitor C1, and it is an equivalent of the current consumption of the shunt regulator 206 in FIG. 1 or that of the error amplifier 310 in FIG. 2. Assuming that the capacitance of the output capacitor C1 is 100 uF, the ripple $\Delta V$ is 100 mV, and $T_{ON}$=0, the switching period t1 of the DC/DC converter 200r in FIG. 1 and the switching period t2 of the DC/DC converter 200 in FIG. 2 are expressed as below.

$$t1 \approx 100 \text{ uA} \times 100 \text{ mV} / 700 \text{ uA} = 14.28 \text{ ms}$$

$$t2 \approx 100 \text{ uA} \times 100 \text{ mV} / 200 \text{ uA} = 50 \text{ ms}$$

Accordingly, the DC/DC converter 200 of FIG. 2 can lower its switching frequency to one third in comparison with that of the DC/DC converter 200r in FIG. 1 in the light load state. That is, the switching loss required by the controller 202 for charging/discharging the gate of the switching transistor M1 is reduced to one third.

In addition, the single package including the driver circuit 302 and the error amplifier 310 simplifies the design of the DC/DC converter 200 and/or the AC/DC converter 100.

Figure 4:
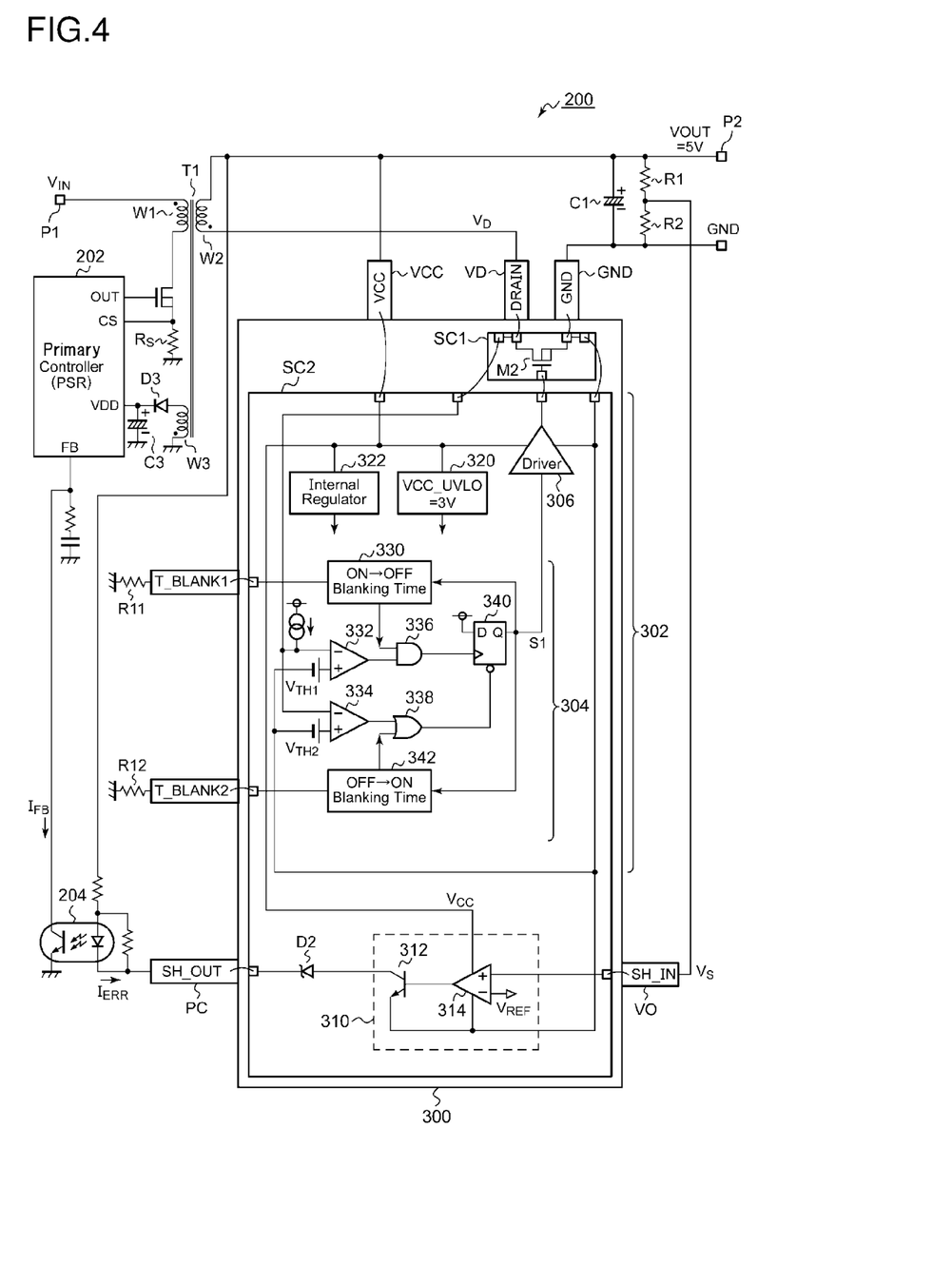
FIG. 4 is a circuit diagram showing a specific configuration of the DC/DC converter in FIG. 2.

FIG. 4 is a circuit diagram showing a specific configuration of the DC/DC converter in FIG. 2. A sense resistor Rs is provided in series with the switching transistor M1 at the primary side of the transformer T1. The controller 202 monitors the primary current based on a voltage drop across the sense resistor Rs. The primary current may be used for current-mode switching and/or an over current protection. The configuration of the controller 202 is not limited, and it may include a pulse modulator with peak-current mode, average-current mode or off-period fixed mode.

A rectifier diode D3 and a smoothing capacitor C3 are coupled to an auxiliary winding W3, which is provided to the transformer T1. A voltage across the capacitor C3 is supplied to the controller 202 as the power supply voltage.

Next, description will be made below regarding the synchronous rectifier controller 300. The synchronous rectifier transistor M2 is configured as a built-in component of the synchronous rectifier controller 300. The synchronous rectifier controller 300 includes two semiconductor chips (dices) SC1 and SC2. The semiconductor chip SC1 is fabricated with high voltage process and the synchronous rectifier transistor M2 is integrated on the chip SC1. The driver circuit 302 and the error amplifier 310 are integrated on the semiconductor chip SC2.

The driver circuit 302 includes an UVLO (Under-Voltage Lockout) circuit 320, an internal regulator 322, and a regulator 324 for the driver in addition to the pulse generator 304 and the driver 306. The UVLO circuit 320 shuts down the driver circuit 302 when the voltage at VCC terminal becomes lower than a threshold (3V). The internal regulator 322 receives the voltage at the VCC terminal and supplies a regulated voltage to other circuits. The regulator 324 for the driver receives the voltage at the VCC terminal and supplies a regulated power supply voltage to the driver 306.

The pulse generator 304 includes a blanking circuit 330, a set comparator 332, a reset comparator 334, an AND gate 336, an OR gate 338, a flip-flop 340, and a blanking circuit 342.

A high voltage clamp circuit (unshown) may be provided between the drain of the synchronous rectifier transistor M2 and the input terminals (−) of the set comparator 332 and the reset comparator 334. The set comparator 332 compares the drain-source voltage $V_{DS}$ of the synchronous rectifier transistor M2 with the first threshold voltage $V_{TH1}$ (=−50 mV). When $V_{DS}<V_{TH1}$, an output of the set comparator 332 is asserted (high-level), an output (pulse signal) S1 of the flip-flop 340 changes to the on-level (high).

The reset comparator 334 compares the drain-source voltage $V_{DS}$ of the synchronous rectifier transistor M2 with the second threshold voltage $V_{TH2}$ (=−10 mV). When $V_{DS}>V_{TH2}$, an output of the reset comparator 334 is asserted (low-level), the flip-flop 340 is reset, and its output S1 changes to off-level (low).

The blanking circuits 330 and 342 masks the set pulse from set comparator 332 and the reset pulse from reset comparator 334 respectively while the drain voltage $V_D$ of the synchronous rectifier transistor M2 fluctuates due to noise. The blanking (mask) periods of the blanking circuits 330 and 342 can be adjusted according to external resistors R11 and R12 coupled to T_BLANK1 terminal and T_BLANK2 terminal respectively. The AND gate 336 generates the logical AND of the set pulse and the output of the blanking circuit 330 so as to mask the set pulse. Similarly, the OR gate 338 generate the logical OR of the reset pulse and the output of the blanking circuit 342 so as to mask the reset pulse.

Second Embodiment

Figure 5:
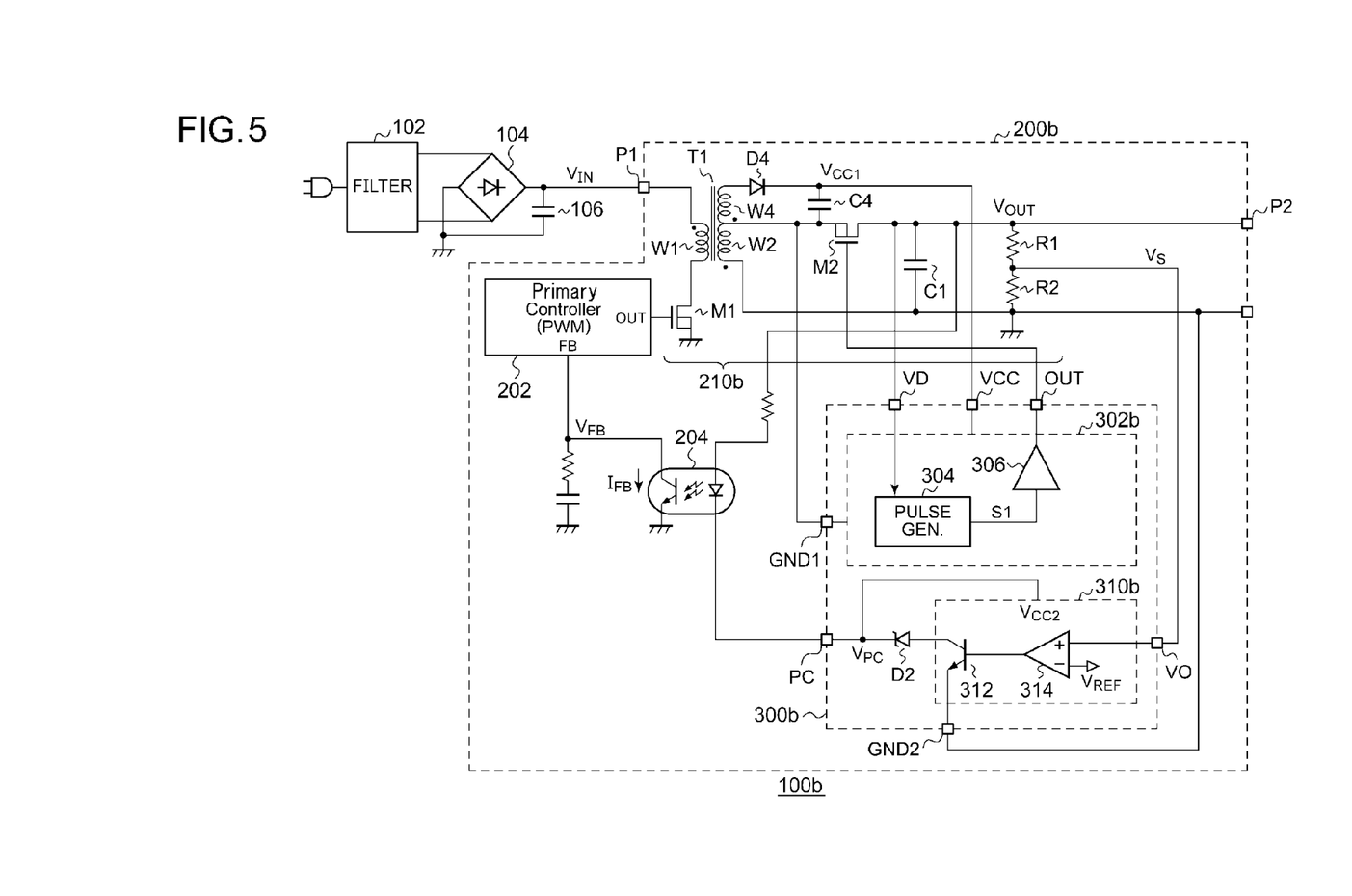
FIG. 5 is a circuit diagram of an AC/DC converter according to a second embodiment.

FIG. 5 is a circuit diagram of an AC/DC converter 100b according to a second embodiment. The configuration of the DC/DC converter 200b is different from that in FIG. 2. Specifically, the synchronous rectifier transistor M2 of the output circuit 210b is provided at a high voltage side of the secondary winding W2 of the transformer T1.

The synchronous rectifier controller 300b includes the driver circuit 302b and the error amplifier 310b. The basic configuration and the operation are same as those of FIG. 2. In this embodiment, a power supply plane for the error amplifier 310b and a power supply plane for the driver circuit 302b are isolated each other, and a ground plane for the error amplifier 310b and a ground plane for the driver circuit 302b are isolated each other. The driver circuit 302b and the error amplifier 310b are integrated on separate semiconductor chips (dice), and packaged in a single module. In one embodiment, the driver circuit 302b and error amplifier 310b may be integrated on a single chip if the process design rule allows two isolated power supply planes and two isolated ground planes in the single chip.

The ground plane of the driver circuit 302b is coupled to the source of the synchronous rectifier transistor M2 via the GND1 terminal. VD terminal is coupled to the drain of the synchronous rectifier transistor M2.

An auxiliary winding W4 of the transformer T1, a diode D4 and a capacitor C4 generate a power supply voltage $V_{CC1}$ with reference to the source of the synchronous rectifier transistor M2. The power supply voltage $V_{CC1}$ is supplied to the power supply plane of the driver circuit 302b via VCC terminal of the synchronous rectifier controller 300b.

On the other hand, the ground plane of the error amplifier 310b is coupled to the ground in the secondary side via the GND2 terminal. The power supply plane of the error amplifier 310b is supplied with the voltage $V_{PC}$ at the PC terminal or an internal power supply voltage $V_{CC2}$ which is generated from the voltage $V_{PC}$.

Figure 6:
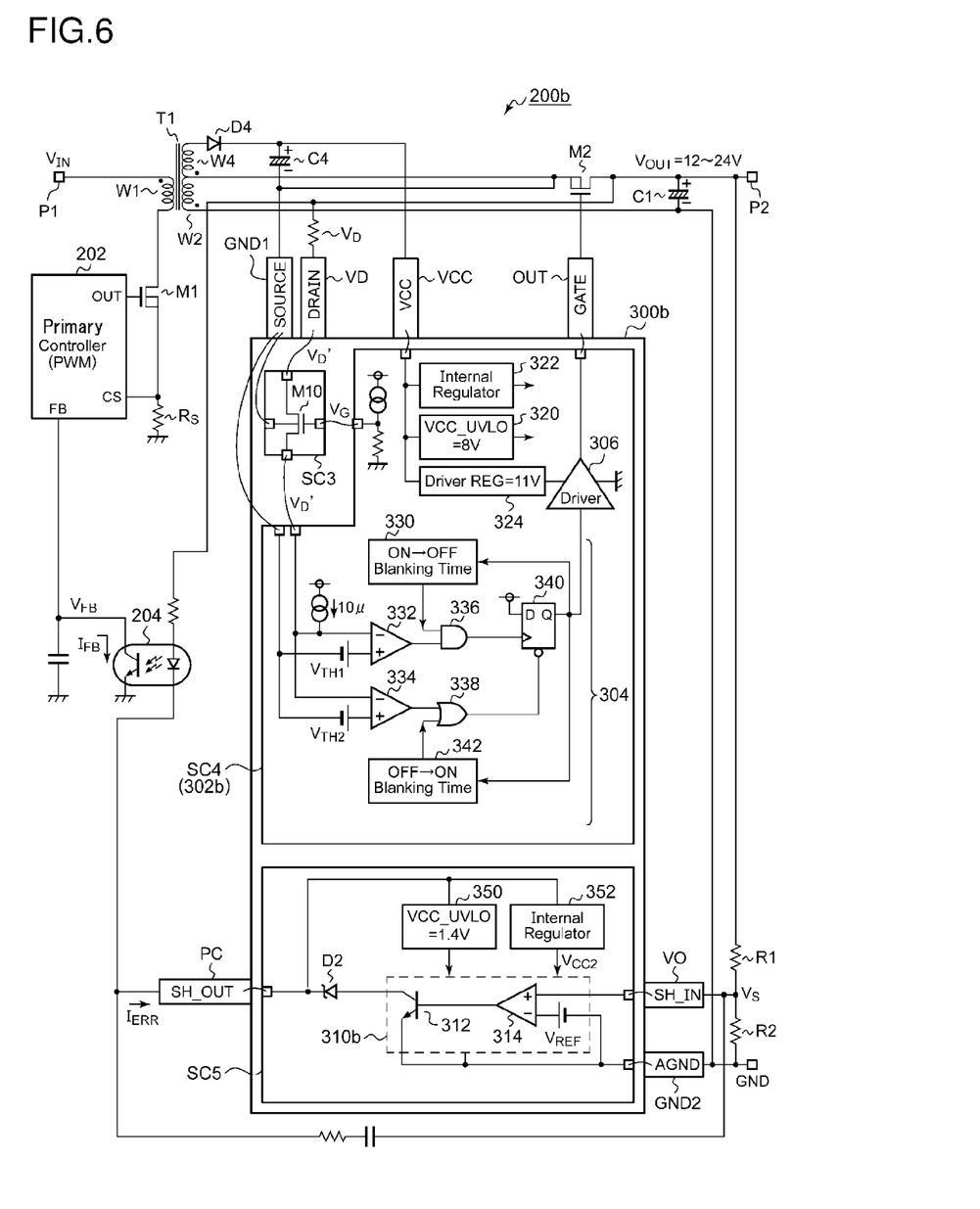
FIG. 6 is a circuit diagram showing a specific configuration of the DC/DC converter in FIG. 5.

FIG. 6 is a circuit diagram showing a specific configuration of the DC/DC converter in FIG. 5. The synchronous rectifier controller 300b includes three semiconductor chips SC3, SC4 and SC5. The semiconductor chip SC3 is fabricated with the high-voltage process, and includes a transistor M10 configured as FET, and its gate is supplied with a predetermined bias voltage $V_C$, and clamps the drain voltage $V_D$ of the synchronous rectifier transistor M2. The clamped voltage $V_D{}'$ by the transistor M10 is supplied to the set comparator 332 and the reset comparator 334. The semiconductor chip SC4 corresponds to the driver circuit 302b of FIG. 5, and includes the pulse generator 304 and driver 306 as shown in FIG. 4.

On the semiconductor chip SC5, the error amplifier 310b, an UVLO circuit 350, and an internal regulator 352 are integrated. The UVLO circuit 350 compares a voltage at the PC terminal (SH_OUT pin) with a predetermined threshold voltage (1.4 V), and stops the circuits on the semiconductor chip SC5 when the UVLO state is detected. The internal regulator 352 receives the voltage at the PC terminal and supplies the error amplifier 310b with an internal power supply voltage $V_{CC2}$ which is regulated.

The above is the configuration of the synchronous rectifier controller 300b. According to the synchronous rectifier controller 300b, the current consumption can be reduced as well as the first embodiment. Further, the switching loss in the light load state can be reduced at the primary side.

Additionally, in the second embodiment, the ground planes and the power supply planes are isolated between the driver circuit 302b and the error amplifier 310b respectively. Therefore, in a platform where the synchronous rectifier transistor M2 is disposed at the high voltage side, the error amplifier 310b can drive the photo coupler 204 with the ground voltage at secondary side as its ground plane, while the driver circuit 302b drives the synchronous rectifier transistor M2 with the source voltage of the synchronous rectifier transistor M2 as its ground plane.

Figure 7:
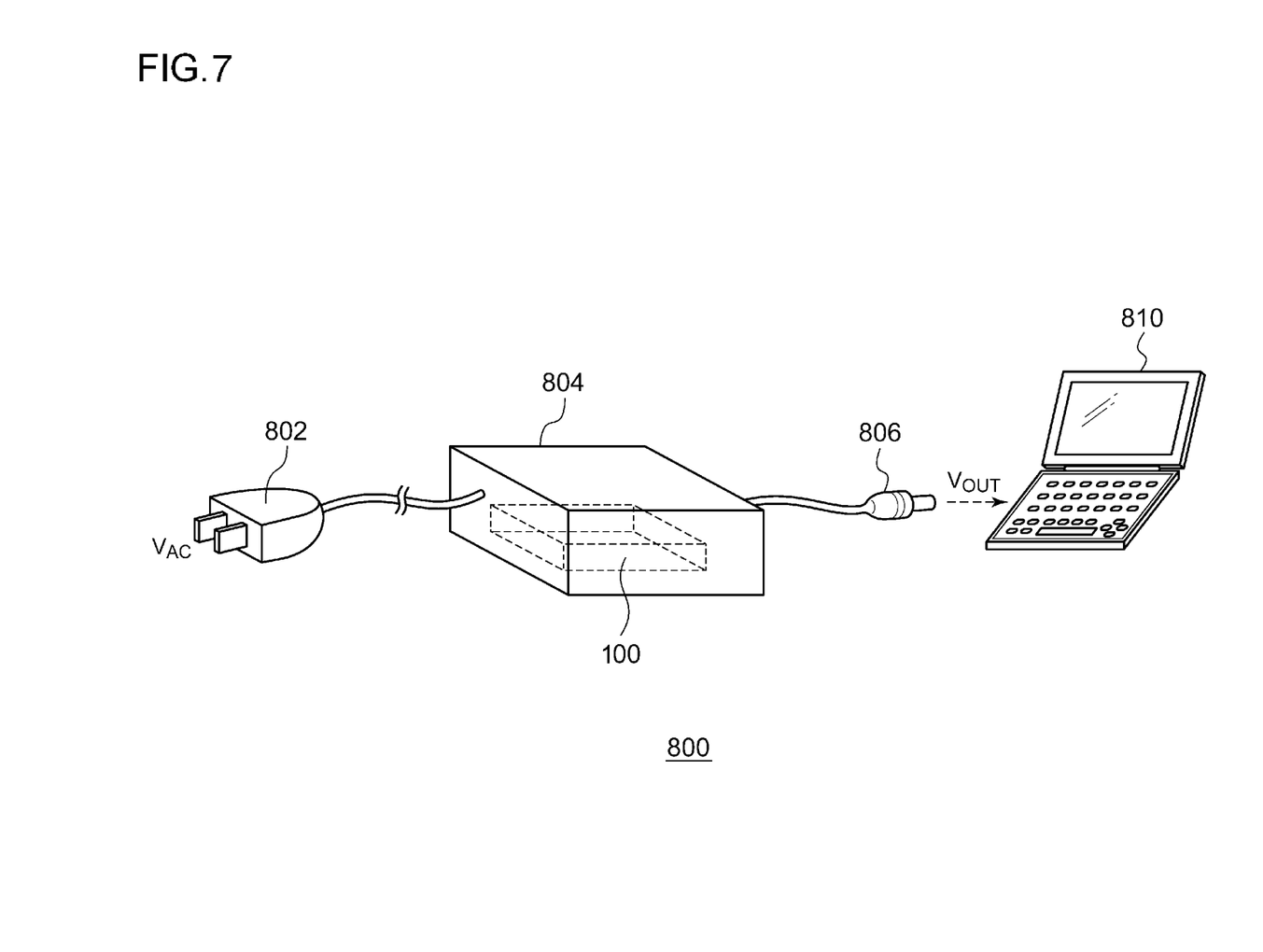
FIG. 7 is a diagram showing an AC adaptor provided with the AC/DC converter.

Next, description will be made regarding the usage of the DC/DC converter 200. FIG. 7 is a diagram showing an AC adapter 800 including the AC/DC converter 100. The AC adapter 800 includes a plug 802, a casing 804, and a connector 806. The plug 802 receives commercial AC voltage $V_{AC}$ from an unshown outlet. The AC/DC converter 100 is mounted within the casing 804. The DC output voltage $V_{OUT}$ generated by the AC/DC converter 100 is supplied to an electronic device 810 via the connector 806. Examples of such an electronic device 810 include laptop PCs, digital still cameras, digital video cameras, cellular phones, portable audio players, and the like.

Figure 8A:
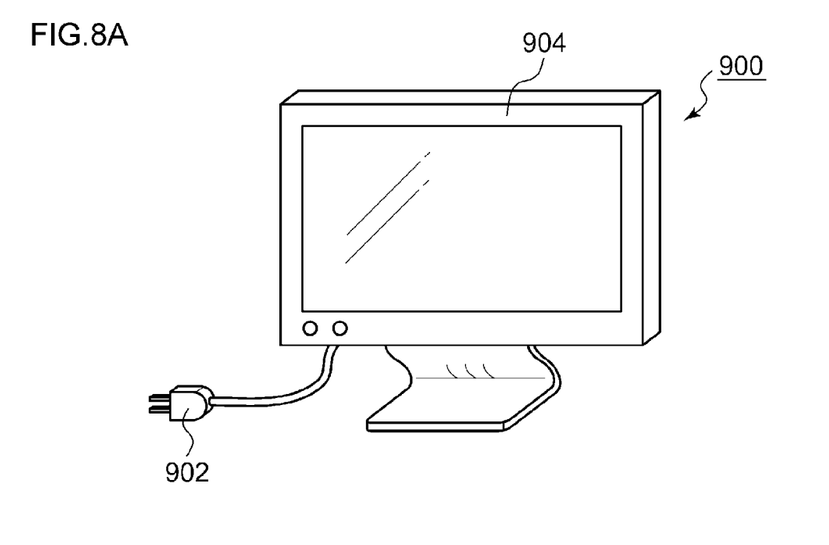
FIGS. 8A and 8B show electronic devices provided with the AC/DC converter.
Figure 8B:
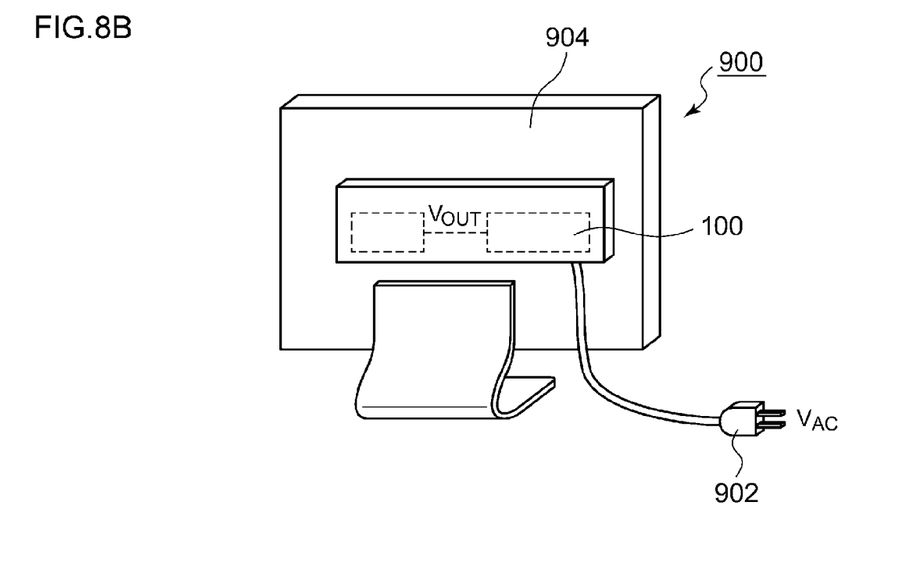

FIGS. 8A and 8B are diagrams each showing an electronic device 900 including the AC/DC converter 100. The electronic device 900 shown in FIGS. 8A and 8B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc. The plug 902 receives commercial AC voltage $V_{AC}$ from an unshown outlet. The AC/DC converter 100 is mounted within the casing 904. The DC output voltage $V_{OUT}$ generated by the AC/DC converter 100 is supplied to a load mounted in the same casing 904. Examples of such a load include microcomputers, DSPs (Digital Signal Processors), lighting devices, analog circuits, digital circuits, and the like.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

(1st Modification)

In the embodiments, the present invention may be applied not only to flyback converter, but also forward converter. In the forward converter, plural synchronous rectifying transistors are provided at the secondary side of the transformer T1. In this modification, the synchronous rectifier controller may include the driver circuit 302 configured to switch the plural synchronous rectifying transistors and error amplifier 310, which are integrated in a single package. Otherwise, combination of plural synchronous rectifier controllers in FIG. 2 or FIG. 5 may support the forward converter. The converter may be a QR (Quasi-Resonant) converter.

(2nd Modification)

At least one of the switching transistor and the synchronous rectifier transistor may be configured as a bipolar transistor or IGBT.

While the preferred embodiments of the present invention have been described using specific terms, such description is for illustrative purposes only, and it is to be understood that changes and variations may be made without departing from the spirit or scope of the appended claims.

What is claimed is:

1. A synchronous rectifier controller provided on a secondary side of an insulation-type synchronous DC/DC converter, comprising:
   a driver circuit configured to switch a synchronous rectifier transistor provided on the secondary side of the DC/DC converter;
   a photo coupler connection terminal coupled to an input side of a photo coupler; and
   an error amplifier structured to amplify an error between a voltage detection signal according to an output voltage of the DC/DC converter and its target voltage, and to draw a current according to the error from the input side of the photo coupler via the photo coupler connection terminal, wherein the synchronous rectifier controller is packaged in a single module;
   wherein a power supply plane for the error amplifier and a power supply plane for the driver circuit are isolated from each other, and a ground plane for the error amplifier and a ground plane for the driver circuit are isolated from each other; and
   wherein the power supply plane for the error amplifier is supplied with an internal power supply voltage which is generated from a voltage at the photo coupler connection terminal, and the ground plane of the error amplifier is supplied with a ground voltage at the secondary side of the DC/DC converter.

2. The synchronous rectifier controller according to claim 1, wherein the synchronous rectifier transistor is provided at a high voltage side of a secondary winding of a transformer, and the transformer further comprises an auxiliary winding provided at its secondary side, and the DC/DC converter is structured to generate, by using the auxiliary winding, a power supply voltage with reference to a voltage potential at a line connecting the synchronous rectifier transistor to the secondary winding, and wherein the ground plane of the driver circuit is supplied with the voltage potential at the line, and the power supply plane of the driver circuit is supplied with the power supply voltage.

3. The synchronous rectifier controller according to claim 1, wherein the error amplifier is integrated on one semiconductor chip, and the driver circuit is integrated on another semiconductor chip.

4. The synchronous rectifier controller according to claim 1, wherein the error amplifier comprises:
   a differential amplifier that amplifies the error between the voltage detection signal and the target voltage; and
   an output transistor having its base/gate receiving an output signal of the differential amplifier, its emitter/source connected to a ground, and its collector/drain connected to the photo coupler connection terminal.

5. The synchronous rectifier controller according to claim 1, wherein the driver circuit comprises:
   a pulse generator that generates a pulse signal, wherein a level of the pulse signal changes according to at least a voltage across the synchronous rectifier transistor; and
   a driver that drives the synchronous rectifier transistor according to the pulse signal.

6. The synchronous rectifier controller according to claim 5, wherein (i) the pulse generator sets the pulse signal at an on-level when the voltage across the synchronous rectifier transistor becomes lower than a predetermined negative first threshold voltage, and (ii) the pulse generator sets the pulse signal at an off-level when the voltage across the synchronous rectifier transistor becomes higher than a predetermined negative second threshold voltage, the second threshold voltage being higher than the first threshold voltage.

7. The synchronous rectifier controller according to claim 6, wherein the pulse generator comprises:
   a set comparator structured to compare the voltage across the synchronous rectifier transistor and the first threshold voltage so as to generate a set pulse;
   a reset comparator structured to compare the voltage across the synchronous rectifier transistor and the second threshold voltage so as to generate a reset pulse; and
   a flip-flop structured to change its output according to the set pulse and the reset pulse.

8. The synchronous rectifier controller according to claim 7, wherein the pulse generator further comprises a blanking circuit structured to mask the set pulse and the reset pulse for a predetermined period.

9. The synchronous rectifier controller according to claim 1, wherein the DC/DC converter is a flyback converter.

10. The synchronous rectifier controller according to claim 1, wherein the DC/DC converter is a forward converter.

11. A power supply apparatus comprising:
   a filter structured to filter a commercial AC voltage;
   a diode rectifier circuit structured to full-wave rectify an output voltage of the filter;
   a smoothing capacitor coupled to smooth an output voltage of the diode rectifier circuit, so as to generate a DC input voltage; and
   an insulation-type synchronous DC/DC converter comprising:
      a transformer having its primary winding and its secondary winding;
      a switching transistor coupled to the primary winding of the transformer;
      a synchronous rectifier transistor coupled to the secondary winding of the transformer;
      an output capacitor;
      a photo coupler;
      a synchronous rectifier controller provided on a secondary side of the insulation-type synchronous DC/DC converter, the synchronous rectifier controller comprising:
         a driver circuit configured to switch the synchronous rectifier transistor;
         a photo coupler connection terminal coupled to an input side of the photo coupler; and
         an error amplifier structured to amplify an error between a voltage detection signal according to an output voltage of the DC/DC converter and its target voltage, and to draw a current according to the error from the input side of the photo coupler via the photo coupler connection terminal, wherein the synchronous rectifier controller is packaged in a single module; wherein the driver circuit comprises:
            a pulse generator that generates a pulse signal, wherein a level of the pulse signal changes according to at least a voltage across the synchronous rectifier transistor; and
            a driver that drives the synchronous rectifier transistor according to the pulse signal;
         wherein (i) the pulse generator sets the pulse signal at an on-level when the voltage across the synchronous rectifier transistor becomes lower than a predetermined negative first threshold voltage, and (ii) the pulse generator sets the pulse signal at an off-level when the voltage across the synchronous rectifier transistor becomes higher than a predetermined negative second threshold voltage, the second threshold voltage being higher than the first threshold voltage; and wherein the pulse generator comprises:
- a set comparator structured to compare the voltage across the synchronous rectifier transistor and the first threshold voltage so as to generate a set pulse;
- a reset comparator structured to compare the voltage across the synchronous rectifier transistor and the second threshold voltage so as to generate a reset pulse; and
- a flip-flop structured to change its output according to the set pulse and the reset pulse;

wherein the synchronous rectifier controller is structured to switch the synchronous rectifier transistor, and to supply a current according to an error between an output voltage at the output capacitor and its target voltage to the input side of the photo coupler; and
a primary controller coupled to an output of the photo coupler, and configured to control the switching transistor according to a feedback signal from the photo coupler;

wherein the insulation-type synchronous DC/DC converter is configured to step down the DC input voltage, and to supply the stepped down DC input voltage to a load.

12. A synchronous rectifier controller provided on a secondary side of an insulation-type synchronous DC/DC converter, comprising:
a driver circuit configured to switch a synchronous rectifier transistor provided on the secondary side of the DC/DC converter;

a photo coupler connection terminal coupled to an input side of a photo coupler; and an error amplifier structured to amplify an error between a voltage detection signal according to an output voltage of the DC/DC converter and its target voltage, and to draw a current according to the error from the input side of the photo coupler via the photo coupler connection terminal, wherein the synchronous rectifier controller is packaged in a single module;

wherein the driver circuit comprises:
- a pulse generator that generates a pulse signal, wherein a level of the pulse signal changes according to at least a voltage across the synchronous rectifier transistor; and
- a driver that drives the synchronous rectifier transistor according to the pulse signal;

wherein (i) the pulse generator sets the pulse signal at an on-level when the voltage across the synchronous rectifier transistor becomes lower than a predetermined negative first threshold voltage, and (ii) the pulse generator sets the pulse signal at an off-level when the voltage across the synchronous rectifier transistor becomes higher than a predetermined negative second threshold voltage, the second threshold voltage being higher than the first threshold voltage; and wherein the pulse generator comprises:
- a set comparator structured to compare the voltage across the synchronous rectifier transistor and the first threshold voltage so as to generate a set pulse;
- a reset comparator structured to compare the voltage across the synchronous rectifier transistor and the second threshold voltage so as to generate a reset pulse; and
- a flip-flop structured to change its output according to the set pulse and the reset pulse.

* * * * *